United States Patent [19]
Debrunner

[11] 3,815,247
[45] June 11, 1974

[54] DEVICE FOR THE MEASUREMENT OF THE ANGLE OF KYPHOSIS

[76] Inventor: Hans Ulrich Debrunner, 8 Niesenweg, 3038 Kirchlindach, Switzerland

[22] Filed: Feb. 14, 1973

[21] Appl. No.: 332,487

[30] Foreign Application Priority Data
Feb. 18, 1972  Switzerland................... 2357/72

[52] U.S. Cl. ............... 33/75 R, 33/79 B, 33/174 D
[51] Int. Cl. ........................................... G01b 5/24
[58] Field of Search........ 33/75 R, 151, 174 D, 150, 33/79 B, 27 B, 174 A, 174 P, 174 PA, 178 R, 178 D, 144, 146

[56]  References Cited
UNITED STATES PATENTS
583,058   5/1897   King...................... 33/112
1,095,552  5/1914   Colpitts................. 33/79 B Primary Examiner—Louis R. Prince
Assistant Examiner—Charles E. Phillips
Attorney, Agent, or Firm—McGlew and Tuttle

[57] ABSTRACT

A device for the measurement of the angle of kyphosis of the human spinal column is disclosed. The device is provided with an angularly calibrated scale and a cooperating pointer pivotably connected to the scale. The scale carrying member is so coupled to a first probe member by a first parallelogram linkage that a portion of the scale carrying member extending between the points of pivotal interconnection with the first linkage is always parallel to a contact surface provided on the first probe member. The pointer is so coupled to a second probe member by a second parallelogram linkage that a portion of a member carrying the pointer extending between the points of pivotal interconnection with the second linkage is always parallel to a contact suface provided on the second probe member. In use, the respective contact surfaces of the first and second probe members are pressed against separated spinous processes of a human spine to measure the difference in slope between the two parts of the spinal column contacted by the respective probe members. This angular deviation is indicated by displacement of the pointer relative to the scale.

5 Claims, 1 Drawing Figure

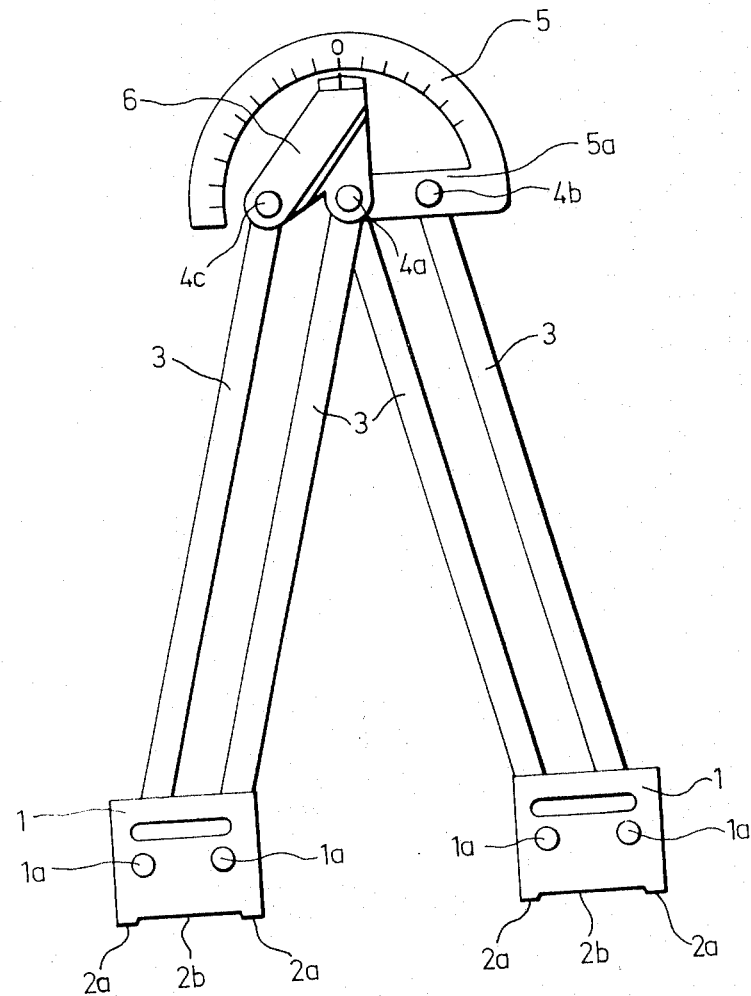

DEVICE FOR THE MEASUREMENT OF THE ANGLE OF KYPHOSIS

BACKGROUND OF THE INVENTION

The present invention relates to a device for measuring the angle of kyphosis of the human spinal column.

Kyphos is the convex prominence of the human spine in kyphosis, which is a condition indicated by an abnormally increased convexity in the curvature of the thoracic spine as viewed from the side. The angle of the deviation of the axis of the human spinal column from the linear between different points is designated as the angle of kyphosis and this angle provides a measure of the curvature of the spinal column.

It is known to determine the curvature of the spinal column in an indirect manner by measurement of the length of the cord of an arc and the height of an arc described by a section of the spinal column on the assumption that the curvature of that section approximates to that of a circle. These measurements are expressed as a ratio, which is only meaningful by comparison with similarly derived ratios relating to other spinal columns.

It is an object of the present invention to provide a device which enables deviations of the axis of the human spinal column from the linear to be measured directly in angular units. These measurements may be carried out when the body of the patient is in different positions, resulting in different attitudes of the spinal column, and thus these measurements enable the range of movement of the spinal column to be determined.

It is another object of the present invention to provide a measuring device which, when compared with conventional methods involving the measurement of an image of the spinal column on an X-ray plate, is simple, rapid and may be used to make a series of examinations without the need to subject the patient to successive applications of X-rays, with the consequent hazard of radio-active contamination.

SUMMARY OF THE INVENTION

According to the present invention, there is provided a device for the measurement of the angle of kyphosis comprising first and second probe members, first and second parallelogram linkages, a scale provided with markings, and indicator means pivotably connected to the scale, opposite sides of the first parallelogram linkage being connected to the scale and to the first probe member respectively, opposite sides of the second parallelogram linkage being connected to the indicator means and to the second probe member respectively, and each probe member having means defining a contact surface parallel to the said opposite sides of the respective linkage.

BRIEF DESCRIPTION OF THE DRAWING

An embodiment of the invention will now be more particularly described with reference to the single FIGURE of the accompanying drawing, which shows an elevation of a device embodying the invention.

DESCRIPTION OF THE PREFERRED EMBODIMENT

As shown in the drawing, the device is provided with two probe members 1 in the form of plates each having means defining a contact surface comprising two parallel ridges 2a projecting from the edges of the respective probe members 1, and intermediately disposed depressions 2b of a depth of about two millimetres. Each probe member 1 is pivotably connected with two elongate limbs 3 by means of pivot axes 1a extending parallel to the contact surfaces defined by the ridges 2a. The two pivot axes of one of the probe members 1 have the same spacing as the two pivot axes of the other one of the probe members 1. The links 3 are all of equal length. Each pair of mutually parallel links 3 forms a parallelogram linkage and the ends of the links 3 forming one of these parallelogram linkages are pivotably connected with a radial arm 5a of an angularly calibrated semi-circular scale carrying member 5 by means of two further pivot axes 4a and 4b. The spacing between the pivot axes 4a and 4b is equal to that between each pair of axes 1a. The pivot axis 4a extends through the centre of the semi-circular scale member 5. The second pair of parallel elongate links 3 is connected with indicator means 6 by means of the pivot axis 4a and a further pivot axis 4c. The axis 4c is parallel to the axis 4a and is spaced the same distance therefrom as the axis 4b. The indicator means 6 is provided with an index mark which registers against the calibrations provided on the scale carrying member 5. This index mark is so disposed on the indicator means 6 that it points to a central null position on the angularly calibrated scale when the contact surfaces of the respective probe members 1 are parallel. The null point is marked in the centre of the scale to facilitate the carrying out of angular measurements in two opposite directions.

Due to this construction, the contact surface defined by a line contacting the pair of mutually spaced ridges 2a on the right hand probe member 1 in the drawing is always parallel to a line interconnecting the pivot axes 4a and 4b. Also, the contact surface of the left hand probe member 1 in the drawing is always parallel to a line interconnecting the pivot axes 4a and 4c. Thus, the displacement of the index mark on the indicator means 6 relative to scale calibration corresponds to the relative inclination of the contact surfaces of the respective probe members 1. The scale calibrations as well as the index mark are arranged correspondingly on both sides for more convenient readability. Variations in the distance between the two probe members 1 does not affect the position of the index mark relative to the scale calibration, provided that the contact surfaces of the respective probe members 1 remain parallel to one another.

For measuring the angle of kyphosis, the probe members 1 are applied at about the second and twelfth dorsal vertebrae with their respective contact surfaces on the spinous processes of the spinal column. Due to the depressions 2b provided between each pair of ridges 2a defining the contact surfaces, the seating of the probe members 1 on the skin covering the spinous processes of the spinal column is improved, and their seating is not substantially affected by the patient bending or stretching his spine. The angle of kyphosis can be read off directly in angular units from the angularly calibrated scale provided on the scale carrying member 5. The length of the parallel links 3 is so chosen that measurements can be carried out on the human back without the device becoming unmanageable. The dimensions of the members forming the device are so chosen that the following measuring ranges are obtainable:

up to 90° at a spacing of 20.5 centimetres between the centres of the contact surfaces of the respective probe members;

up to 80° at a spacing of 25 centimetres between the centres of the contact surfaces; and up to 67° at a spacing of 30 centimetres between the centres of the contact surfaces.

The device embodying the invention enables the curvature of the axis of the spinal column to be measured in different body positions and with different attitudes of the spinal column. The device also enables the range of movement of the spinal column to be measured. The curvature can be measured with the spinal column bent as well as stretched.

I claim:

1. A device for the measurement of the angle of kyphosis comprising in combination:

a scale provided with markings;

indicator means pivotably connected to said scale;

first and second probe members;

means defining a contact surface on each said probe member;

a first parallelogram linkage having mutually opposed sides connected to said scale and to said first probe member respectively; and a second parallelogram linkage having mutually opposed sides connected to said indicator means and to said second probe member respectively; each said contact surface being parallel to the imaginary line between the connections of said mutually opposed sides of said respective parallelogram linkage to said contact surface defining means.

2. A device as defined in claim 1, wherein said means defining a contact surface on each said probe member each comprise a pair of ridges projecting beyond an intermediate surface portion of said respective probe member.

3. A device as defined in claim 1, wherein said scale carries angular markings and is provided with a central marking, which is aligned with said indicator means when and only when said contact surfaces of said respective probe members are parallel to one another.

4. A device for the measurement of the angle of kyphosis, comprising an indicator scale having a radial arm portion and a circumferential portion connected to said radial arm portion, said circumferential portion having a scale indication thereon, an indicator pivoted on said arm portion and being pivotal to move adjacent the scale indications, a first parallel linkage including a first probe having a first straight contact surface and a pair of first parallel linkage arms each pivoted at their one ends to said arm portion and pivoted at their opposite ends to said first probe member, the connecting points of said first linkage arms to said first probe member being on a line which is parallel to said straight contact surface, and a second parallel linkage including a second probe member having a second straight contact surface, a pair of second parallel linkage arms each pivoted at their one ends to said indicator and pivoted at their opposite ends to said indicator and pivoted at their opposite ends to said second probe member, the connecting points of said second linkage arms to said indicator including at least one connection at a spaced location from the pivotal connection of said indicator to said arm portion.

5. A device according to claim 1 wherein said indicator includes a radially extended portion having an index thereon and an oblique portion extending to one side of said radially extended portion and connected to one of said second parallel linkage arms.

* * * * *